US011842632B2

(12) United States Patent
Clewlow et al.

(10) Patent No.: US 11,842,632 B2
(45) Date of Patent: Dec. 12, 2023

(54) FLEET TRACKING AND BEHAVIOR MODIFICATION IN GEOGRAPHIC AREAS OF INTEREST

(71) Applicant: Populus Technologies, Inc., San Francisco, CA (US)

(72) Inventors: Regina Ruby Lee Clewlow, San Francisco, CA (US); Fletcher Scott Foti, Oakland, CA (US)

(73) Assignee: POPULUS TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 17/706,619

(22) Filed: Mar. 29, 2022

(65) Prior Publication Data

US 2023/0316899 A1 Oct. 5, 2023

(51) Int. Cl.
*G05D 5/02* (2006.01)
*G08G 1/01* (2006.01)
*G08G 1/00* (2006.01)

(52) U.S. Cl.
CPC ........... *G08G 1/0129* (2013.01); *G08G 1/207* (2013.01)

(58) Field of Classification Search
CPC ............................ G08G 1/0129; G08G 1/207
See application file for complete search history.

(56) References Cited

U.S. PATENT DOCUMENTS

2018/0053237 A1 2/2018 Hayes et al.
2020/0198651 A1* 6/2020 Levy .................... G05D 1/0297
2023/0066476 A1* 3/2023 Ludwig .............. G01C 21/3626

OTHER PUBLICATIONS

PCT Invitation to Pay Additional Fees, PCT Application No. PCT/US2023/063765, dated Jun. 29, 2023, 3 pages.

* cited by examiner

*Primary Examiner* — Hongmin Fan
(74) *Attorney, Agent, or Firm* — Fenwick & West LLP

(57) ABSTRACT

Systems and methods are disclosed herein for a mobility management system that serves as a data processing intermediary between mobility operators and governing entities that define rules associated with vehicle behavior occurring in a geographic region. The system receives from a mobility operator historical vehicle data including GPS locations for fleet vehicles within the geographic region. The system determines aggregate behavior metrics for the vehicles using the behavior data. If the aggregate behavior metrics exceed one or more behavior thresholds for a specified time period, the system generates one or more suggested behavior modifications for the vehicles or mobility operators. Moreover, the historical vehicle data may be used to train a machine-learned model to predict a number and behavior of vehicles within the geographic region at a specific time, and if the current number or behavior of vehicles satisfies pre-determined governing criteria, the system modifies one or more vehicle rules.

12 Claims, 7 Drawing Sheets

400

500

600

FLEET TRACKING AND BEHAVIOR MODIFICATION IN GEOGRAPHIC AREAS OF INTEREST

TECHNICAL FIELD

The present disclosure relates to mobility management systems, and in particular to performing fleet tracking and behavior modifications in geographic areas of interest.

BACKGROUND

Vehicle events occurring in defined geographic regions, such as cities or towns, typically include direct interactions occurring between an individual vehicle owner and a controlling entity, such as a municipality responsible for roads, curb spaces, bridges, and other vehicle infrastructure. For operators of vehicle fleets, adjusting vehicle behavior to account for aggregated vehicle event data requires a manual analysis of a large amount of fleet vehicle event data or policies (such as parking policies) that often do not exist in a digital form. In such instances, it is very difficult or not possible to analyze such data and modify or incentivize vehicle behavior based on the analysis in real-time, particularly for large fleets of vehicles. Moreover, a mobility operator associated with a single fleet does not have access to vehicle behavior data for other fleets of vehicles and therefore cannot adjust the behavior of its own fleet on that basis.

SUMMARY

Systems and methods are disclosed herein for a mobility management system that serves as a data processing intermediary between mobility operators and a governing entity that defines rules for vehicle parking or other events occurring in a geographic region. The governing entity may be a public or private entity that operates geographic areas of interest, such as delivery zones, on-street parking zones, congestion zones, parking lots, parking garages, parking meters, and the like for various types of vehicles, such as delivery vehicles, rideshare or carshare vehicles, shared autonomous vehicles, rental vehicles, privately owned vehicles, scooters, or other micromobility vehicles. For example, a public governing entity might be a city that governs parking events occurring in loading or delivery zones. Each governing entity provides to the mobility management system governing data defining the locations of geographic areas of interest associated with the entity as well as vehicle rules that apply to parking events or non-parking related vehicle events within the geographic area. For example, vehicle rules may relate to fees incurred when a vehicle parks (or stops) in a geographic area of interest or passes through a toll (or zone) in the geographic region or may specify parking restrictions for one or more types of geographic areas of interest, such as rules limiting parking or stopping in a delivery zone to a specified type of vehicle (e.g., a delivery vehicle) and specified times of day.

The system receives from mobility operators parking or trip event data indicating GPS locations and associated durations for vehicles in a fleet. For each parking or trip event, the system maps the GPS data to the governing data to identify a geographic area of interest associated with the GPS location. For example, the system might use the GPS location information to identify a specific delivery zone or an on-street parking zone in which a parking event occurred. In one embodiment, the system further determines the applicability of one or more of the vehicle rules to each parking event. Parking event durations or the occurrence of non-parking related vehicle events and associated rule data for fleet vehicles are periodically transmitted to the mobility operator or governing entity server.

Additionally, in some configurations, the mobility management system generates fleet behavior modifications based on historical behavior data that includes, for each vehicle in the fleet, corresponding GPS location information for the vehicle while the vehicle was within the geographic region. In one embodiment, the system uses the historical data to generate one or more aggregate behavior metrics for the fleet vehicles, such as metrics regarding the application of vehicle rules for fleet vehicles over a specified time period, and compares the aggregate behavior metrics to a behavior threshold specified by the mobility operator. If the aggregate behavior metrics exceed at least one behavior threshold, the system may generate one or more suggested behavior modifications for the fleet vehicles and report the suggested behavior modification(s) to the mobility operator. For example, if the behavior threshold is a cap on a total amount of time that fleet vehicles have spent parked in a specific portion of the geographic region over a time period, the system might generate a behavior modification directing fleet vehicles to parking areas in different portions of the geographic region for the remainder of the month after the cap has been exceeded. In another example, if the threshold is a cap on the number of a specific type of vehicle (e.g., delivery vehicles) permitted in the geographic region, the system might generate a behavior modification directing fleet vehicles to move or pick up vehicles of the specified type if the cap is exceeded.

Still further, the mobility management system may modify vehicle rules based on the historical behavior data. For example, in one embodiment, the data is used to train a machine-learned model to predict a number and behavior of vehicles within the geographic region at a particular time, such as a current or upcoming time period. Model output may be compared to pre-determined governing criteria. For example, the criteria may specify a threshold number of vehicles within the region and include criteria related to the behavior of those vehicles, such as a threshold number of parking events. If at least one of the governing criteria is satisfied (e.g., if the predicted number of vehicles in the geographic region exceeds a threshold), the system modifies one or more vehicle rules, such as by applying a scaling modifier to base parking fees for geographic areas of interest in the region or limiting use of specified types of geographic areas of interest (e.g., delivery zones) to specified times of day.

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

DETAILED DESCRIPTION

System Environment

Figure 1:
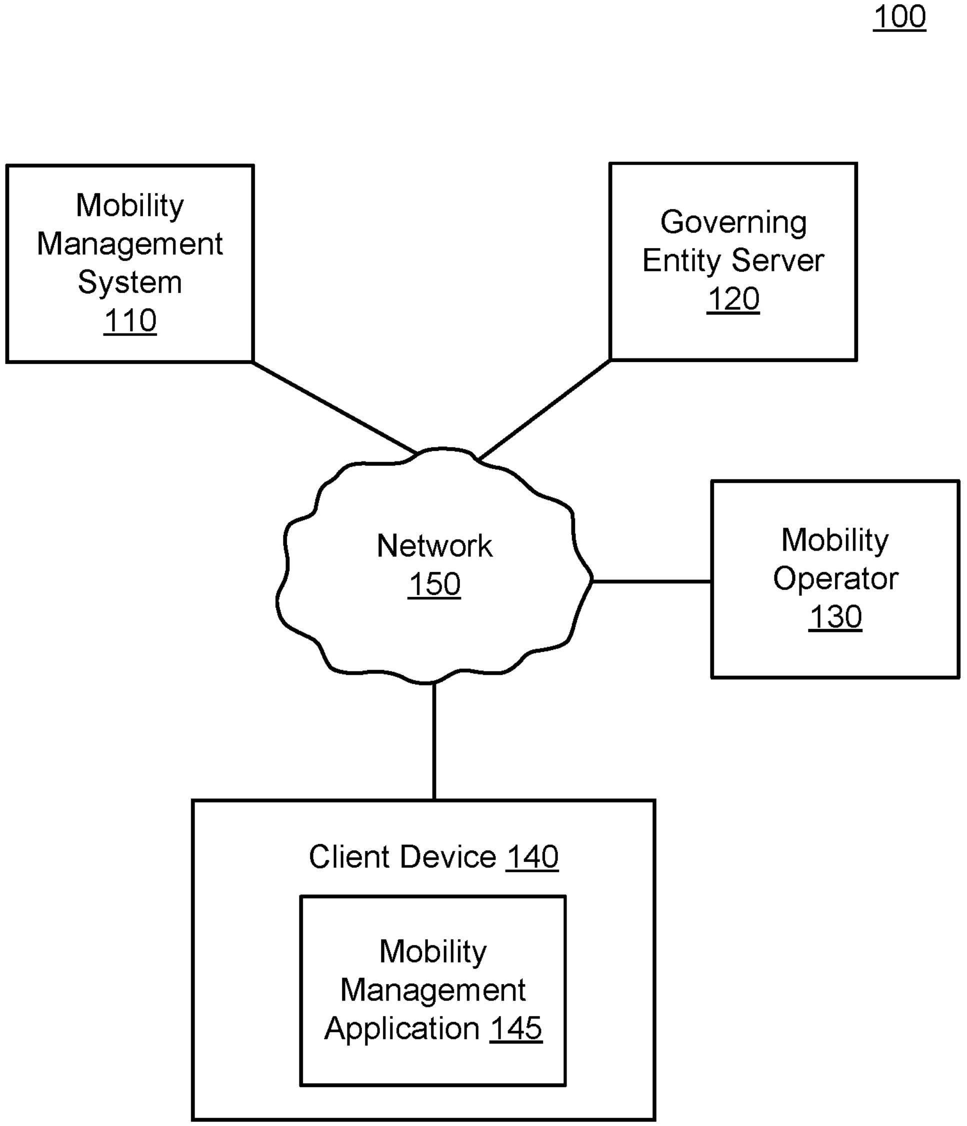
FIG. 1 is a block diagram illustrating a system environment for a mobility management system, according to one embodiment.

FIG. 1 is a block diagram illustrating a system environment 100 for a mobility management system 110, according to one embodiment. In the embodiment shown, the system environment 100 includes the mobility management system 110, a governing entity server 120, a mobility operator 130, a client device 140 having a mobility management application 145, and a network 150. In other embodiments, the system environment 100 includes different or additional elements. For example, while only one governing entity server 120, mobility operator 130, and client device 140 are shown, one of skill in the art will recognize that any number of governing entity servers 120, mobility operators 130, and client devices 140 may be connected to the mobility management system 110 over the network 150. Further, the functionality may be distributed among the elements in a different manner than described. Conventional components such as network interfaces, security functions, load balancers, failover servers, management and network operations consoles, and the like are not shown so as to not obscure the details of the system architecture.

The mobility management system 110 serves as a data processing intermediary between the various components of the system environment 100. In one embodiment, the mobility management system 110 communicates with governing entity servers, such as the governing entity server 120, to receive and store governing entity data indicating geographic areas of interest within specified geographic regions, such as cities or towns. The geographic areas of interest include designated locations for vehicle parking, including parking meters, parking garages, parking lots, delivery zones, congestion zones, public transit stops, and the like and may be associated with one or more rules specifying fees and/or parking/trip restrictions for each geographic area of interest.

As discussed below, the mobility management system 110 further communicates with one or more mobility operators, such as the mobility operator 130, to receive and process vehicle behavior data, including parking or trip event data, for a fleet of vehicles associated with the mobility operator 130. The parking or trip event data defines one or more parking or trip events occurring within the geographic region and includes the geospatial location and duration of the parking or trip event. The mobility operator 130 periodically (e.g., hourly, daily, weekly, etc.) transmits parking or trip event data for the fleet of vehicles to the mobility management system 110, which maps the geospatial locations in the parking or trip event data to the locations of geographic areas of interest and determines the applicability of one or more parking or trip rules corresponding to the reported parking events. In various embodiments, the mobility management system 110 also uses historical vehicle data received from the mobility operator 130 to determine aggregate fleet behavior metrics and generate behavior modifications that may be transmitted to the mobility operator 130. Moreover, historical vehicle data may be used modify one or more vehicle rules governing parking or trip events occurring in the geographic region. The functionality of the mobility management system 110 is discussed in more detail below with respect to FIG. 2.

The governing entity server 120 maintains and provides to the mobility management system 110 governing data for specified geographic regions. In one embodiment, the governing entity server 120 is associated with a city, town, or other community under municipal jurisdiction. Additionally or alternatively, a governing entity server 120 may be associated with a private entity that operates one or more geographic areas of interest within a geographic region, such as a company that operates a parking lot or similar structure. As discussed above, the system environment 100 may include any number of governing entity servers 120. Accordingly, both public and private entities may communicate with the mobility management system 110 to provide governing data for use in fleet tracking and behavior and vehicle rule modification.

The governing entity associated with the governing entity server 120 may manage geographic areas of interest within the jurisdiction of the governing entity, for example, by determining the number, type, and location of parking meters, parking garages, parking lots, delivery zones, congestion zones, and the like as well as by defining rules that govern the conditions under which a vehicle may park at each of the geographic areas of interest or types of geographic area of interest. The location data for the geographic areas of interest includes a mapping that links each geographic area of interest in the region to a corresponding fine-grained geographic position, such as a latitude and longitude, a cell of the S2 hierarchy, or a custom polygon defined by a number of latitude/longitude positions. The mapping indicates, therefore, a real-world position of each geographic area of interest, such as the global positioning system (GPS) location of a parking meter or garage. As discussed below with respect to FIG. 2, the mobility management system 110 queries the mapping to identify geographic areas of interest and apply corresponding rules for received parking or trip event data.

Rules governing parking or trip conditions at the geographic areas of interest may indicate, for example, that vehicle parking is available at a specific geographic area of interest during a first time period but prohibited during a second time period. In another example, the rules may specify that parking is available for a first type of vehicle (e.g., a delivery vehicle) but not for a second type of vehicle (e.g., a scooter) or that different parking or trip fees apply to different vehicle types.

Still further, the rules may specify one or more fees applicable to each geographic area of interest or group of geographic areas of interest, such as when a fee is incurred (e.g., immediately upon vehicle parking or after a specified period of time has elapsed), the basis upon which the fee accumulates (e.g., hourly, daily, etc.), and the fee amount.

Different fee amounts may apply to a geographic area of interest based on various factors, including the time of day or day of the week, whether the parking event occurs on a holiday, and the like. In one embodiment, the governing entity data also includes rules and fees applicable to non-parking related vehicle events, such as fees for tolls or other road usage fees within the geographic region.

Moreover, the rules may include one or more pre-determined governing entity criteria for application of a scaling modifier (e.g., a fee multiplier) that may be applied to parking events that occur during predicted periods of high demand. For example, as discussed below with respect to FIG. 2, a model training module 260 on the mobility management system 110 may be used to generate and train a machine-learned model that uses historical vehicle data received from one or more mobility operators 130 to predict a number and behavior of vehicles within the geographic region at particular times. The governing entity criteria may include criteria for determining whether a current or upcoming period of time qualifies as a period of high demand based on the number and behavior of vehicles within the geographic region, as well as rules that apply if a period of high demand is detected. For example, if a current or predicted level of demand for vehicle parking within the geographic region exceeds a threshold demand level, the governing entity criteria may specify a scaling multiplier that may be applied to parking fees for geographic areas of interest. Scaling modifiers may be applied to all or to a subset of geographic areas of interest in the geographic region, and different modifiers may be applied to different geographic areas of interest or groups of geographic areas of interest. For instance, a first fee multiplier may be applied for parking events occurring at an on-street parking space while a second fee multiplier may be applied to parking events occurring in a parking garage. Still further, different modifiers may be applied to geographic areas of interest based on the current or predicted level of demand. For example, a first scaling modifier may be applied if the level of demand exceeds a first demand threshold, while a second scaling modifier may be applied if a second demand threshold is exceeded.

The locations of and rules defining fees and/or parking restrictions at the geographic areas of interest constitute governing data that is transferred from the governing entity server 120 to the mobility management system 110 for use in vehicle fleet tracking. In one embodiment, the mobility management system 110 periodically queries the governing entity server 120 to request updated governing data and ensure that the rules used to perform fleet tracking are current. Alternatively, the governing entity server 120 automatically transmits updated governing data to the mobility management system 110 (e.g., in the event that one or more of the rules are updated). In still another embodiment, the governing entity enters updated governing data directly into the mobility management system 110 (e.g., through the governing entity interface module 210) such that the mobility management system 110 becomes the "system of record" for the governing data.

The mobility operator 130 manages a fleet of vehicles that operate within the geographic region and are subject to the parking event rules defined in the governing data. The fleet of vehicles may include passenger vehicles, such as rideshare or carshare vehicles, shared autonomous vehicles, rental vehicles, taxis, scooters, bicycles, or other micromobility vehicles. In one embodiment, the mobility operator 130 is a transportation management system that coordinates the transportation of persons and/or items by a service provider (e.g., a driver of a vehicle or an autonomous vehicle). As another example, the mobility operator 130 may manage a fleet of delivery vehicles, such as delivery trucks, that operate within the geographic region.

The mobility operator 130 receives, from the vehicles within the fleet, vehicle behavior data that includes GPS location information and corresponding durations of time during which fleet vehicles were positioned at the GPS locations. In one embodiment, the vehicle behavior data includes parking event data representing parking events occurring at the GPS locations within the geographic region. For example, data for a first parking event might indicate that a first vehicle in the fleet was positioned at a first GPS location for a first duration, while a second fleet vehicle was positioned at a second GPS location for a second duration. Vehicle behavior data may be determined automatically by a location determination module (e.g., a GPS component, a wireless networking system, or a combination thereof) of a vehicle on-board computing system or a client device 140 positioned within the vehicle. Additionally or alternatively, vehicle behavior data may include GPS data regarding instances of fleet vehicles traveling through areas of the geographic region associated with one or more tolls or other road usage fees, or any other GPS or behavioral data, including but not limited to vehicle speeds, preference of roads traveled, number of vehicle occupants, vehicle type, and the like.

In one embodiment, the mobility operator 130 periodically batches vehicle behavior data for the fleet vehicles, and transmits the aggregated data to the mobility management system 110. For example, the mobility operator 130 may send aggregated data to the mobility management system 110 on an hourly, daily, weekly, monthly, or quarterly basis. In an alternate configuration, vehicle behavior data is transmitted to the mobility management system 110 after each individual parking event or specified number of parking events.

Additionally, the mobility operator 130 receives, from the mobility management system 110, reporting data summarizing aggregated fleet behavior data and applicable vehicle rules over a specified time period. In one embodiment, the reporting data comprises the total cost or total duration of all parking events for vehicles associated with the mobility operator 130 and occurring within the geographic region during the time period. The mobility management system 110 may compute and transmit the reporting data to the mobility operator 130 at regular intervals that may be specified by the mobility operator, such as on an hourly, daily, weekly, monthly, or quarterly basis. The reporting data may further include whether aggregate behavior metrics for the fleet vehicles exceed at least one behavior threshold for a given time period as well as one or more suggested behavior modifications determined by the mobility management system, as discussed below with respect to FIG. 2.

The mobility operator 130 may determine which, if any, action(s) to take in response to receiving the reporting data from the mobility management system 110. For example, the mobility operator 130 may instruct vehicles in the fleet to adapt the one or more suggested behavior modifications, such as directing fleet vehicles to park in different portions of the geographic region if a time cap on aggregate fleet vehicle parking in a first portion of the geographic region has been exceeded or to utilize free or low-cost parking if a total parking cost for a specified time period has been exceeded. The mobility operator 130 may further determine how to allocate costs for parking or other fees incurred by fleet vehicles, such as whether to pass parking costs or incurred fees to individuals associated with each of the fleet vehicles or whether to handle directly the payment of the fees to the relevant governing entities.

While the embodiment described above contemplates parking event tracking on a fleet-level (e.g., for a fleet of vehicles operated by a mobility operator 130), one of skill in the art will recognize that that a similar method may be performed for privately owned vehicles that are not part of a fleet and are instead owned by individual users. In such a configuration, a user may interact with the mobility management system 110 through a client device 140 to provide parking event data and receive associated fee information for the identified parking event.

The client device 140 is a portable electronic device such as a smartphone, tablet device, wearable computing device (e.g., smartwatches) or a similar device. Alternatively, the client device 140 corresponds to an on-board computing system of a vehicle, such as an autonomous vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities (e.g., a GPS component).

In one embodiment, a user of the client device 140 interacts with the mobility management system 110 through a mobility management application 145 on the client device 140. The mobility management application 145 can present information received from the mobility management system 110 on a user interface, such as a map of the geographic region and the current location of a vehicle associated with the client device 140. Further, the user interface may include indications of geographic areas of interest, such as icons representing the locations of parking meters, parking garages, parking lots, and the like, and display information regarding the rules associated with each geographic area of interest or group of geographic areas of interest (e.g., when parking is permitted or prohibited, one or more parking fees, etc.).

In one embodiment, the user may provide input through the mobility management application 145 to initiate a parking event at a geographic area of interest. For example, the client device 140 may transmit GPS location information to the mobility management system 110, and the mobility management system 110 may use the governing data to map the received GPS location to a geographic area of interest and initiate a parking event at the identified geographic area of interest. When the user provides additional input confirming that the parking event has ended or when the client device 140 provides second GPS location information indicating that the client device 140 is more than a threshold distance away from the geographic area of interest, the mobility management system 110 updates the status of the parking event (e.g., to indicate that the parking event has ended) and determines the applicability of one or more vehicle rules to the parking event. For example, the mobility management system 110 may query the governing data to identify an applicable hourly fee for the geographic area of interest and apply the fee to the duration of time during which the vehicle was positioned at the geographic area of interest and determine a fee for the parking event. The determined fee amount may be automatically deducted from a user account with the mobility management system 110 or be otherwise transmitted to the user for payment.

The network 150 connects the various components of the system environment 100. The network 150 may be any suitable communications network for data transmission. In an embodiment such as that illustrated in FIG. 1, the network 150 uses standard communications technologies or protocols and can include the internet. In another embodiment, some or all of the components of the system environment 100 use custom or dedicated data communications technologies.

Exemplary Mobility Management System

Figure 2:
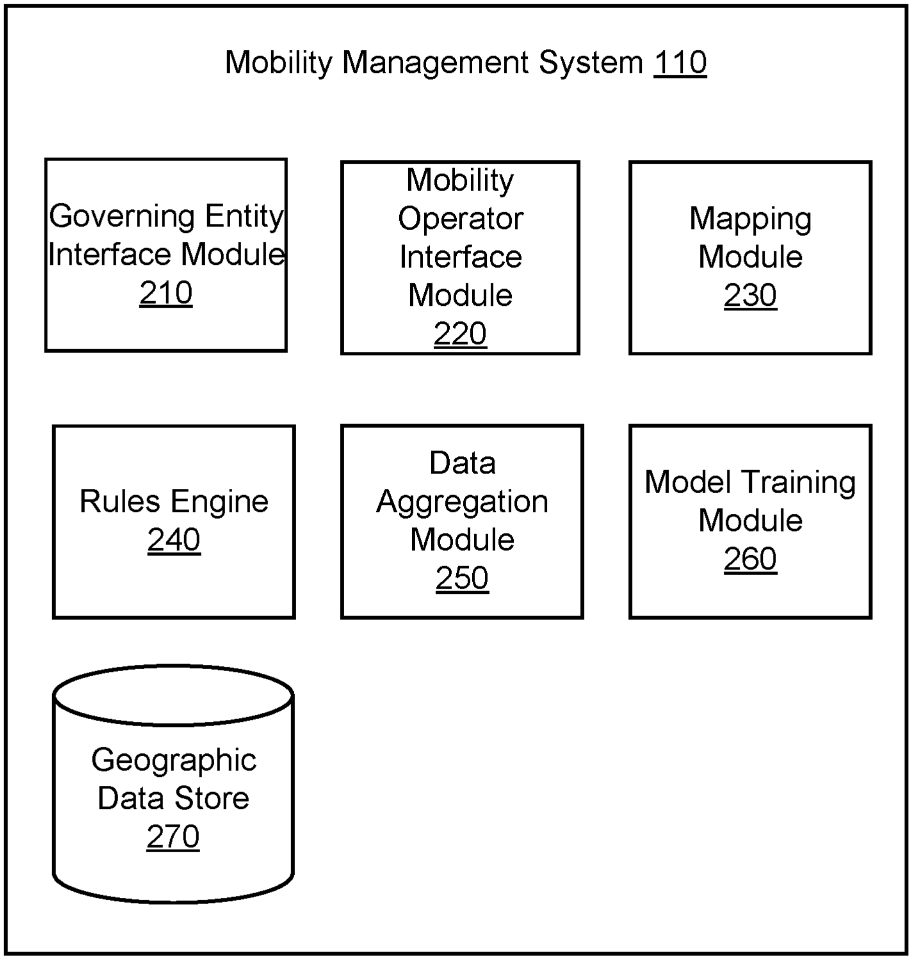
FIG. 2 is a block diagram illustrating components of the mobility management system of FIG. 1, according to one embodiment.

FIG. 2 illustrates an embodiment of the mobility management system 110. In the embodiment shown, the mobility management system 110 includes a governing entity interface module 210, a mobility operator interface module 220, a mapping module 230, a rules engine 240, a data aggregation module 250, a model training module 260, and a geographic data store 270. In other embodiments, there may be different or additional components than those shown in FIG. 2. Further, the functionality may be distributed among the elements in a different manner than described.

The governing entity interface module 210 communicates with the governing entity server 120 to receive governing data specifying the locations and types of geographic areas of interest within the geographic region as well as rules and governing entity criteria applicable to some or all of the geographic areas of interest. In one embodiment, the governing entity interface module 210 receives governing data from more than one governing entity server 120 in a geographic region. For example, a first governing entity server 120 may be associated with a public entity, such as a city, that specifies rules for parking events occurring in public spaces, such as parking meters or other on-street parking. A second governing entity server 120 in the same geographic region may be associated with a private entity, such as an owner or operator of a private parking lot or garage. Accordingly, vehicle rules (e.g., rules relating to applicable fees) in a geographic region may differ based on governing entity (e.g., the entity that provides the governing data for the geographic areas of interest to the governing entity interface module 210).

The governing entity interface module 210 stores received governing data in the geographic data store 270 and may update the stored data responsive to receiving a notification from the governing entity server 120 of one or more changes applicable to the geographic areas of interest (e.g., the addition of new geographic areas of interest, updated fees for parking or tolls, updating parking restrictions, and the like). In one embodiment, the stored governing data includes mappings that correspond each geographic area of interest (e.g., parking meter or other on-street parking) or group of geographic areas of interest (e.g., parking spaces in a parking garage or parking lot) to a GPS location such that, when the mobility management system 110 receives parking event data from a mobility operator 130 or a client device 140, the mapping module 230 may query the stored mapping to identify a geographic area of interest corresponding to the GPS location included in the parking event data, as discussed below. Additionally, the stored governing data may include pre-determined governing entity criteria for determining the applicability of one modifications to the rules governing the geographic areas of interest within the geographic region, such as scaling modifiers that may be applied to fees for parking events occurring during periods of high demand, as discussed in more detail below.

The mobility operator interface module 220 communicates with the mobility operator 130 to receive vehicle behavior data (including data regarding parking events for fleet vehicles, and GPS or other behavioral data) and transmits to the mobility operator 130 aggregated rule data determined based on the vehicle behavior. In embodiments in which the method described herein is performed for privately owned vehicles, the mobility operator interface module 220 also communicates with individual users through the mobility management application 145 on the client device 140 to receive vehicle behavior data and transmit corresponding rule data (e.g., applicable fee information) to the client device 140.

In one embodiment, vehicle behavior data is transmitted to the mobility operator interface module 220 on a periodic (e.g., hourly, daily, monthly, quarterly) basis. Data may be transmitted automatically by the mobility operator 130 or in response to a query from the mobility operator interface module 220 for updated behavior data. Upon receipt, the vehicle behavior data is transmitted to the geographic data store 270 for storage.

In one embodiment, the vehicle behavior data includes GPS location information and associated durations for parking events occurring within the geographic region (i.e., the amount of time that fleet vehicles were positioned at the identified GPS locations). The duration information may include the start time, end time, day of the week, and specific date of each parking event occurring for fleet vehicles within the geographic region. The mobility operator 130 may identify each fleet vehicle associated with a parking event or may provide anonymized vehicle behavior data that indicates a GPS location and duration without specifying the vehicle associated with the parking event. In one embodiment, the mobility operator 130 compares the duration that a fleet vehicle was positioned at a GPS location to a timing threshold and determines that the positioning of the vehicle qualifies as a parking event responsive to the duration exceeding the threshold, such that transitory location data (e.g., corresponding to instances in which vehicles are only briefly stopped at specific locations) is not reported to the mobility management system 110. Still further, vehicle behavioral data may include any GPS or behavioral data for fleet vehicles, including but not limited to vehicle speeds, preference of roads traveled, number of vehicle occupants, vehicle type, and the like.

The mapping module 230 maps GPS location information included in the vehicle behavioral data to geographic areas of interest within the geographic region in which the parking events occurred. To do so, the mapping module 230 queries the geographic data store 270 for one or more stored mappings that link GPS locations within the geographic region to geographic areas of interest. Using the retrieved mapping(s), the mapping module 230 identifies a geographic area of interest for each parking event. The parking event data may represent parking events for multiple vehicles in a fleet or multiple parking events for a privately owned vehicle.

Figure 3:
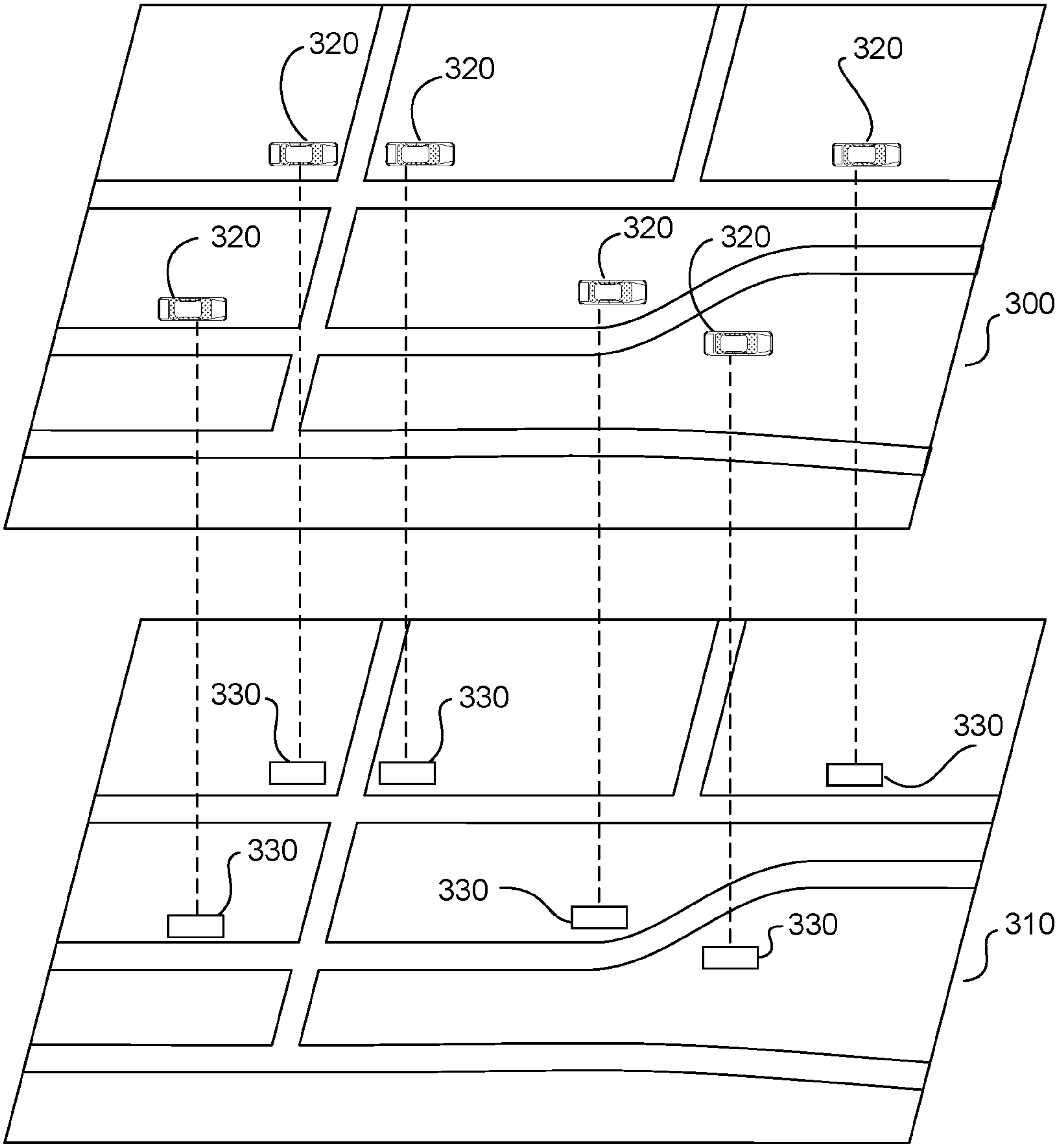
FIG. 3 illustrates a mapping linking GPS traces to geographic areas of interest within a region, according to one embodiment.

For example, FIG. 3 depicts a mapping that links GPS traces received from a mobility operator 130 or a client device 140 to geographic areas of interest within a region. The maps 300 and 310 represent a portion of a geographic region in which vehicle parking is available, such as intersecting city streets that may include one or more of vehicle parking spaces, parking meters, parking garages, parking lots, delivery zones, and the like. As shown in FIG. 3, the map 300 depicts a plurality of GPS traces 320 that each represent a parking event occurring within the geographic region. The mapping module 230 retrieves a mapping of the geographic region (e.g., received from a governing entity server 120) and identifies a geographic area of interest for each GPS trace 320. For example, the map 310 depicts a geographic area of interest 330 corresponding to each of the GPS traces 320 in the map 300.

While the mapping depicted in FIG. 3 illustrates an individual geographic area of interest 330 (corresponding to, for example, an individual parking meter) associated with each GPS trace 320, in other embodiments, the mapping includes one or more groupings of geographic areas of interest corresponding to some or all of the parking events. For example, the mapping might indicate that the parking event occurred within a parking garage or parking lot for which the same set of rules (e.g., parking restrictions and/or fees) apply to all individual parking spaces within the garage or lot. Accordingly, it is not necessary for the mapping module 230 to identify the precise parking space in which the parking event occurred for the rules engine 240 to determine the applicable rule(s) for the parking event. In instances in which the mapping module 230 determines that a received GPS trace does not match (e.g., is not within a threshold distance of) any of the geographic areas of interest within the geographic region, the mapping module 230 may notify the mobility operator 130 or flag the inconsistency in the parking event reporting data.

Moreover, while the mapping depicted in FIG. 3 relates to parking events associated with fleet vehicles, a similar mapping may be used to determine applicable rules governing one or more other types of vehicle behavior. For example, as discussed above, governing data for a geographic region may include locations of tolls or other areas associated with road usage fees. The mapping module 230 compares GPS traces received from the mobility operator 130 or client device 140 to these known locations. If the vehicle or client device 140 is determined to have traveled within a threshold distance of one or more of these locations, the mapping module 230 may determine that the vehicle has traveled through the identified toll and notify the rules engine 240 of the match.

Additionally, while the mapping illustrated in FIG. 3 links the parking event data to geographic areas of interest on a single mapping of the geographic region, in other embodiments, the received GPS traces may be mapped to geographic areas of interest included in different mappings, for example, based on the governing entity that manages the specific geographic areas of interest corresponding to the parking events. For instance, the mobility operator 130 may report a plurality of separate parking events to the mobility management system 110. A first subset of the parking events may correspond to geographic areas of interest governed by a public entity, such as parking meters or a parking garage controlled by a city, while a second subset may correspond to geographic areas of interest governed by a private entity, such as a parking lot operated by a private company.

In some embodiments, the mapping module 230 generates a single mapping for geographic areas of interest within the geographic region based on governing data received from multiple governing entity servers 120. For instance, the mapping shown in FIG. 3 may include geographic areas of interest controlled by multiple entities such that different rules regarding parking restrictions and associated fees and different governing entity criteria apply to the parking events based on the relevant controlling entity. The mapping module 230 may further update mappings stored in the geographic data store 270, for example, upon receipt of updated governing data from one or more governing entity servers 120.

The rules engine 240 determines the applicability of one or more rules to each parking event based on the corresponding geographic area of interest. In one embodiment, the rules relate to parking restrictions and parking fees for the geographic area of interest and may vary based on one or more factors including the type of vehicle, the time of day and day of week, whether the parking event occurs on a holiday, whether a special event is occurring within the geographic region, the duration of the parking event, and the like.

Responsive to the mapping module 230 identifying a geographic area of interest for each parking event, the rules engine 240 retrieves, from the geographic data store 270, governing data for each entity associated with at least one identified geographic area of interest. For example, if the mapping module 230 maps the GPS location information for a plurality of parking events to three different governing entities within the geographic region, the rules engine 240 queries the geographic data store 270 for governing data for each of the identified entities, such as a first entity that operates a private parking garage, a second entity that governs rules for parking of delivery vehicles within the geographic region, and a third entity that operates a parking structure for scooters or other micromobility vehicles.

In one embodiment, the rules engine 240 uses the retrieved rules to identify a cost associated with each parking event. The total cost of the parking event may comprise one or more fees that apply to the geographic area of interest and may be based in part on the duration of the parking event, including a flat rate or hourly charge for parking at the geographic area of interest, a fee for violation of a parking restriction, and a scaling modifier for parking events occurring during a period of high demand. For example, a fee for a first parking event might include an hourly charge for a first period of time during which a vehicle was positioned at a geographic area of interest and a penalty for the vehicle remaining at the geographic area of interest during a subsequent period of time for which vehicle parking was not allowed. In another example, a fee for a second parking event might include a daily charge for parking at the geographic area of interest as well as a fee multiplier applied because the parking event occurred during a period of high demand. In still another example, a fee for a third parking event might comprise a penalty for a first type of vehicle parking in a geographic area of interest reserved for a second type of vehicle, such as a private vehicle parking in a space reserved for delivery vehicles.

Responsive to the rules engine 240 determining the applicable rule(s) for each parking event reported by the mobility operator 130, the data aggregation module 240 aggregates the total cost of the parking events to generate vehicle behavior reporting data for transmission to the mobility operator 130. In one embodiment, the reporting data comprises the total cost for all parking events for vehicles associated with the mobility operator 130 and occurring within the geographic region during a specified period of time. Reporting data may be computed and transmitted to the mobility operator 130 at regular intervals, such as on an hourly, daily, weekly, monthly, or quarterly basis. In various examples, the reporting data might indicate a total amount incurred for fleet vehicles during the specified period without identifying each individual parking event or may include an itemized list of each parking event and the corresponding cost associated with the event.

In one embodiment, the rules engine 240 analyzes historical vehicle behavior (e.g., for a fleet of vehicles or for a privately owned vehicle that is not part of a fleet) and determines aggregate behavior metrics for the one or more vehicles. To do so, the rules engine 240 may query the geographic data store 270 for vehicle behavior data received from the mobility operator 130, such as metrics regarding numbers, durations, and locations of parking events occurring within the geographic region, fees associated with the parking events, instances of the fleet vehicles traveling through tolls or otherwise incurring road usage fees, vehicle speeds, roads traveled by fleet vehicles, number of occupants, vehicle types, and the like over a specified period of time.

The mobility operator 130 (or the individual user in embodiments in which the method is performed for a privately owned vehicle) may specify a vehicle behavior threshold for one or more types of vehicle behavior over a specified period of time. For example, the vehicle behavior threshold may represent a maximum total cost for parking events and/or tolls or other road usage fees that the mobility operator 130 is willing to incur on a daily, weekly, monthly, quarterly, or annual basis. In another example, the threshold represents a cap on the number of parking events of a specified type occurring over a time period (e.g., a cap on a number of parking events occurring in a parking garage, a private parking lot, etc.). The mobility operator 130 may specify different behavior thresholds for different types of vehicles in a fleet or for different geographic regions or subsections of geographic regions, for different time periods (e.g., based on time of day, day of the week, whether it is a holiday), or based on the applicability of different vehicle rules, such as whether a scaling modifier is being applied to parking events occurring within the geographic region.

The rules engine 420 queries the geographic data store 270 for vehicle behavior threshold information for a mobility operator 130 and compares the aggregate vehicle behavior data for a specified time period to one or more retrieved thresholds. If the rules engine 420 determines that aggregate behavior data exceeds at least one behavior threshold, the rules engine 420 generates one or more behavior modifications for the fleet of vehicles. For example, if the behavior threshold is a cap on a total amount of time spent parking in a particular portion of the geographic region (in the fleet aggregate, over a time period), the system might generate a behavior modification directing fleet vehicles to parking areas in different portions of the geographic region for the remainder of the time period after the cap has been exceeded.

In another example, if the vehicle behavior threshold specifies a total parking event fee for the mobility operator on a weekly basis, and if the rules engine 420 determines that the total cost incurred to-date exceeds the threshold amount, the rules engine 420 might generate a behavior modification that directs fleet vehicles to lower-cost or free parking in the geographic period for the remainder of the time period (e.g., the rest of the week). In still another example, if the rules engine 420 determines that fleet vehicles have traveled through tolls or incurred road usage fees more than a threshold number of times over a given time period, the rules engine 240 may determine whether one or more alternative or lower-cost routes are available and may generate a recommendation that fleet vehicles attempt to travel on the identified routes through the geographic region. The one or more suggested behavior modifications may be transmitted to the mobility operator 130 or to the client device 140. In embodiments in which the fleet vehicles are autonomous or semi-autonomous and are centrally controlled, the mobility operator 130 modifies the behavior of fleet vehicles in response to receiving the behavior modification(s).

Additionally, in some embodiments, the rules engine 240 notifies the mobility operator or client device 140 if the one or more vehicle behavior thresholds for a specified period of time have not been reached, such as if fleet vehicles have not incurred total costs exceeding a daily or weekly budget. In this way, the mobility operator 130 may instruct fleet vehicles to avoid areas of high-cost parking or parking in areas where scaling modifiers are being applied if over-budget or may instruct vehicles to proceed with parking in such areas despite associated high costs if under budget.

The model training module 260 generates and trains a machine-learned model that uses historical vehicle behavior information to predict a number and behavior of vehicles within the geographic region at a particular time. In one embodiment, the historical vehicle behavior information comprises data received from one or more mobility operators 130 regarding parking events and non-parking related vehicle events for fleet vehicles in the geographic region. For example, the data may include, for each vehicle in the fleet, corresponding GPS location information for the vehicle while the vehicle was in the geographic region, durations that the vehicle was located at each GPS location in the geographic region, whether the vehicle's presence in the geographic region triggered application of any vehicle rules (e.g., related to parking events or non-parking related vehicle events), or GPS or other vehicle behavioral data, such as vehicle speeds, preference of roads traveled, number of vehicle occupants, vehicle type, and the like. Similar data may be collected from client devices 140 associated with privately owned vehicles (e.g., vehicles that are not part of a fleet). The historical vehicle behavior information may be stored as training data in the geographic data store 270.

The model training module 260 applies machine learning techniques to generate and train the machine-learned model (using the stored training data) to output a vehicle behavior prediction for the geographic region. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

In one embodiment, input to the model comprises data defining a current time or upcoming time period, such as the time of day, day of the week, occurrence of a holiday, or occurrence of a special event within the geographic region (e.g., a sporting event, a concert, etc.), and the vehicle behavior prediction is an estimated number and behavior of vehicles in the geographic region during the specified time period. The behavior prediction may include, for example, an indication of whether and how many of the vehicles in the geographic region will trigger application of vehicle rules (e.g., how many vehicles are likely to park in the geographic region, the types of geographic areas of interest where the parking events will occur, the duration of the parking events, how many vehicles are likely to incur non-parking event related fees, such as tolls, etc.). Alternatively, the machine-learned model outputs an indication of whether a number of vehicles in the geographic region currently exceeds or will exceed (e.g., at a specified future time) a threshold amount. The indication may comprise a Boolean yes/no estimate or a scalar value representing a probability. Still further, the machine-learned model might generate one or more fleet vehicle behavioral predictions, such as a number of vehicles in the geographic region that use a specific road, an average number of passengers in a fleet vehicle, a number of fleet vehicles of a specific type (e.g., delivery trucks) in the geographic area, and the like.

The rules engine 240 uses the model output to determine whether the vehicle behavior prediction satisfies pre-determined governing entity criteria. For example, where the output comprises a prediction that the number of vehicles in the geographic region currently exceeds or will exceed a threshold defined in the governing entity criteria, the rules engine 240 determines that the governing entity criteria are satisfied. Where the model output comprises a predicted number and behavior of vehicles in the geographic region, the rules engine 240 performs the comparison between the output and the threshold. Regardless of whether the determination is performed by the machine-learned model or the rules engine 240, satisfaction of the governing entity criteria (e.g., representing current or predicted demand over the threshold amount) causes the rules engine 240 to modify one or more vehicle rules as specified in the governing entity criteria. For example, the modification may be application of a scaling multiplier or other price modifier applied to parking events or non-parking related vehicle events occurring in the geographic region. Other modifications to vehicle rules may include limiting use of designated areas (e.g., delivery zones) to specified times of day and with varied pricing based on whether the designated area is used either during or outside the specified windows; imposing vehicle restrictions based on a time of day, type of vehicle, type of geographic area of interest, or a combination thereof; imposing a limitation on a number of vehicles per mobility operator 130 permitted in part or all of the geographic region, and the like. The mobility management system 110 thus uses the machine-learned model to predict vehicle congestion and parking demand in the geographic region based on historical vehicle data and adjusts applicable rules where demand levels are predicted to be high.

Still further, in one embodiment, the governing entity criteria comprises a maximum number of vehicles in the geographic region that use one or more specific roads, an average number of passengers per vehicle, an average number of one or more specific types of vehicles in the area, or the like. The rules engine 240 compares the model output (i.e., representing a prediction of current or future fleet vehicle behavioral data) to the one or more thresholds contained in the governing entity criteria, and if one or more of the governing entity criteria are satisfied, the rules engine 240 modifies one or more vehicle rules as specified in the governing entity criteria. In this way, governing entities may incentivize or disincentivize certain types of vehicle behavior. For example, to reduce congestion in the geographic region after a special event, such as a concert, the rules engine 240 may lower speed limits or increase tolls or other road usage fees. Moreover, the rules engine 240 may generate one or more suggested behavior modifications for fleet vehicles based on the model output, for example, by routing vehicles away from or around a particular street or location within the geographic region, limiting travel in certain areas or on certain streets to high-occupancy vehicles, or the like.

Example Methods

Figure 4:
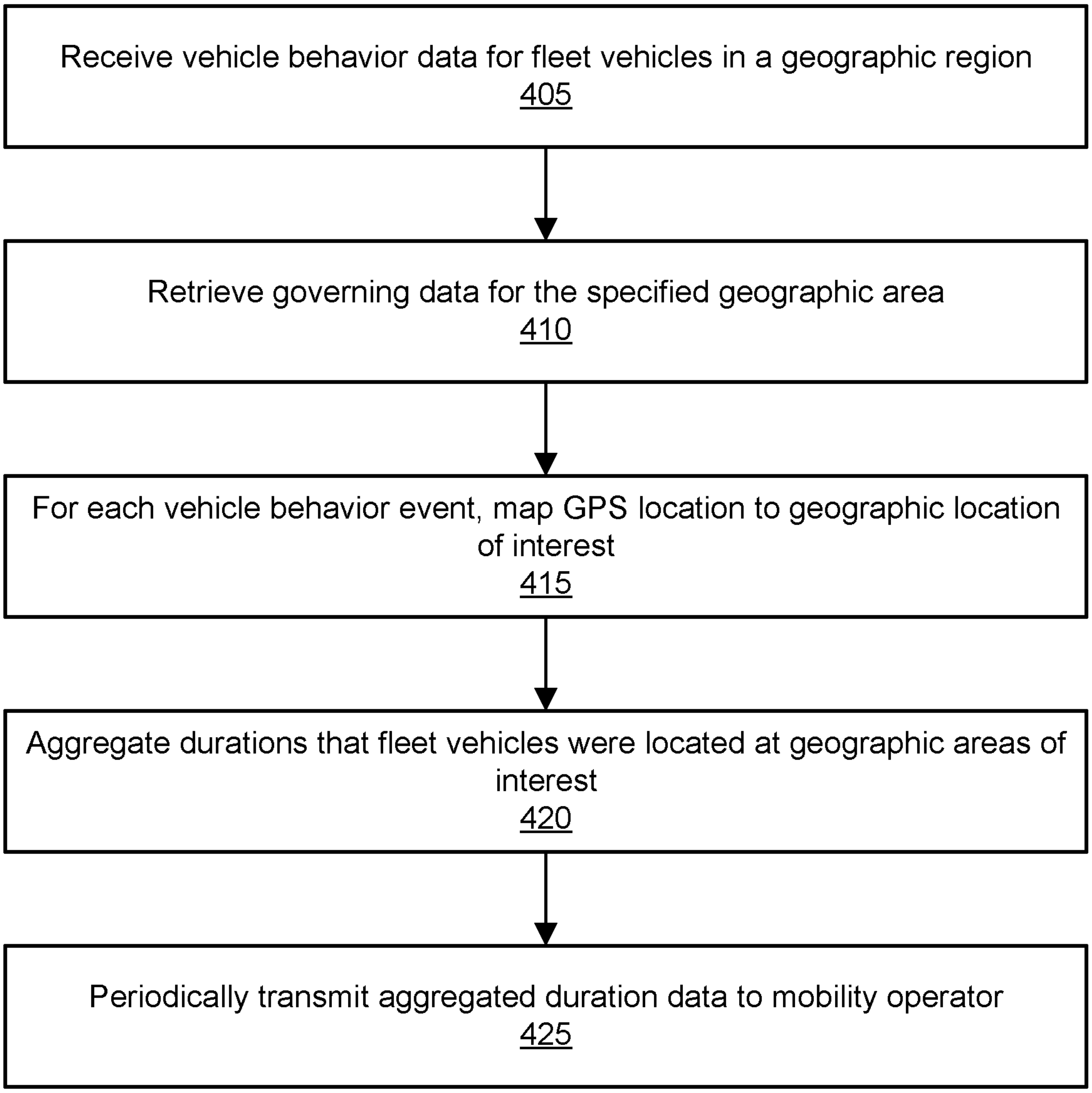
FIG. 4 is a flow chart illustrating a method for performing fleet vehicle tracking in geographic areas of interest, according to one embodiment.

FIG. 4 is a flow chart illustrating a method 400 for performing fleet tracking in geographic areas of interest, in accordance with one embodiment. The steps of FIG. 4 are illustrated from the perspective of the mobility management system 110 performing the method 400. However, some or all of the steps may be performed by other entities and/or components. In addition, some embodiments may perform the steps in parallel, perform the steps in different orders, or perform different steps.

The method 400 begins with the mobility operator interface module 220 of the mobility management system 110 receiving 405 vehicle behavior data, such as parking event data, for a fleet of vehicles in a geographic region. The received data indicates, for each parking event or non-parking-related vehicle event, a corresponding GPS location and a duration that a fleet vehicle was positioned at the GPS location.

In response to receiving the vehicle behavior data, the mapping module 230 retrieves 410 governing data for the specified geographic area from the geographic data store 270. For example, in one embodiment, the geographic region is a city or town, and the governing data defines the locations of and rules associated with geographic areas of interest within the city or town, such as parking garages, parking meters, parking lots, parking spaces, delivery zones, congestion zones, and the like for various types of vehicles, such as rideshare or carshare vehicles, shared autonomous vehicles, rental vehicles, taxis, scooters, bicycles, other micromobility vehicles, delivery vehicles, etc. The governing data may be specified by one or more public or private governing entities that operate and determine rules for the geographic areas of interest. In one embodiment, the rules associated with the geographic areas of interest include one or more fees that apply to parking events occurring at the geographic areas of interest.

For each vehicle behavior event included in the received data, the mapping module 230 uses the retrieved governing data to map 415 the GPS location to a geographic area of interest. The mapping might indicate, for example, that a GPS location at which a fleet vehicle was located corresponds to a parking space having a parking meter managed by the city or town. In another example, the mapping module 230 might determine that the GPS location is within a privately owned parking garage.

A data aggregation module 250 on the mobility management system 110 aggregates 420 the durations that the fleet vehicles were positioned at the identified geographic areas of interest within the geographic region. In one embodiment, the individual parking events or aggregated duration data may be used by a rules engine 240 to determine the applicability of one or more vehicle rules, such as fees that apply to the vehicle behavior event. The aggregated data may be periodically transmitted 425 to the mobility operator 130 associated with the fleet, such as on a daily, weekly, monthly, or quarterly basis. In one embodiment, the aggregated data comprises reporting data that includes the total cost of vehicle behavior events for fleet vehicles within the geographic region.

Figure 5:
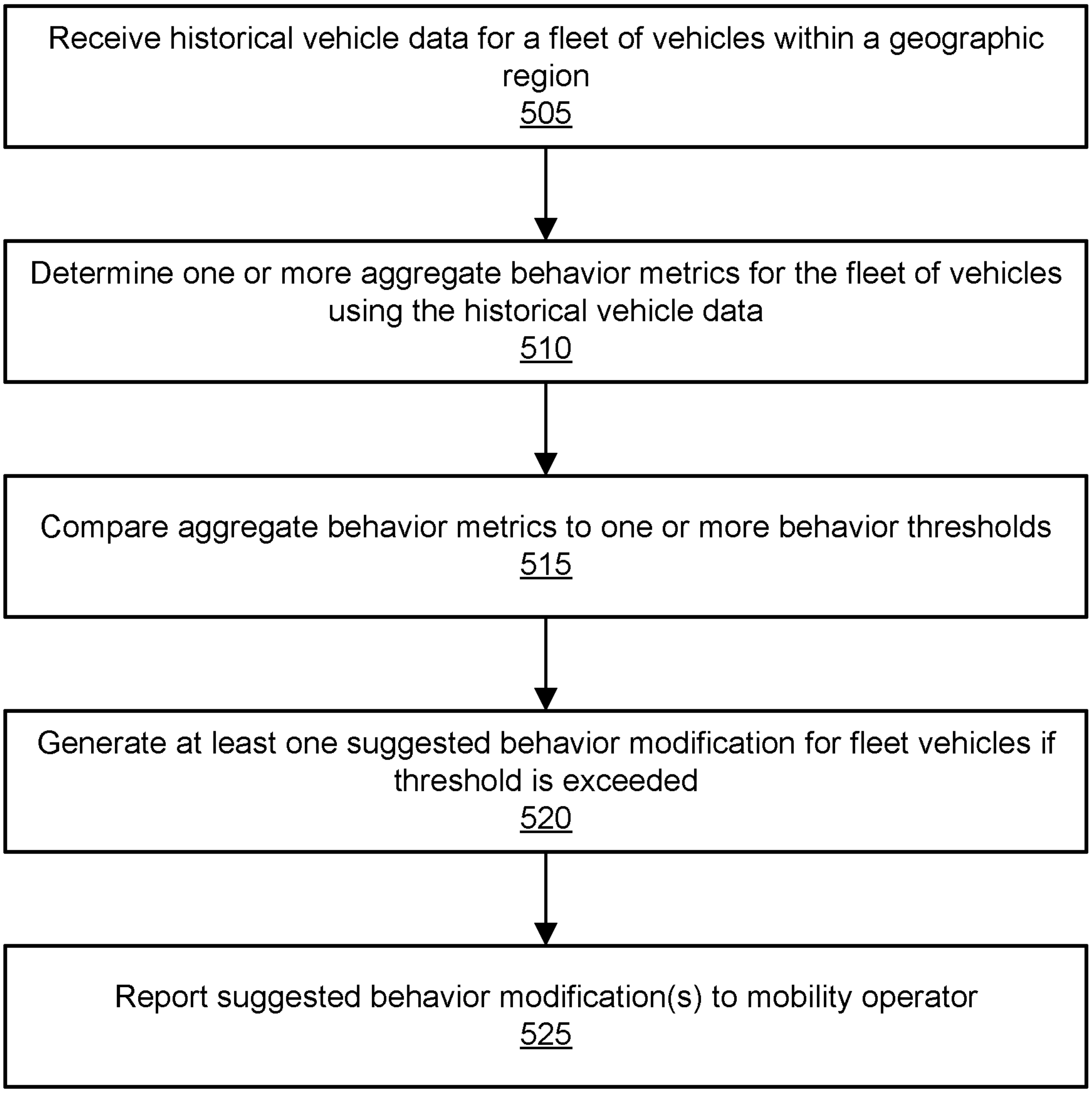
FIG. 5 is a flow chart illustrating a method for generating fleet vehicle behavior modifications based on historical behavior data, according to one embodiment.

FIG. 5 is a flow chart illustrating a method 500 for generating fleet vehicle behavior modifications based on historical behavior data, in accordance with one embodiment. The method 500 begins with the mobility operator interface module 220 of the mobility management system 110 receiving 505 historical vehicle data for a fleet of vehicles within a geographic region for a specific time period. The historical vehicle data includes, for each vehicle in the fleet, corresponding GPS location information for the vehicle while the vehicle was within the geographic region.

In one embodiment, the mapping module 230 and rules engine 240 use the historical vehicle data from the mobility operator 130 to identify corresponding geographic areas of interest and determine applicable vehicle rules, as described in the method 400. For example, the rules engine 240 might determine that a first fee applies to a parking event occurring at an identified geographic area of interest (e.g., within a parking garage) and that a second fee applies to a non-parking related vehicle event, such as a fleet vehicle traveling through a toll or another area associated with a road usage fee.

The rules engine 240 further uses the historical vehicle data to determine 510 one or more aggregate behavior metrics for the fleet of vehicles. The aggregate behavior metrics might include, for example, total parking event fees for fleet vehicle parking events over a specified time period or a number of tolls or other road usage fees incurred by the vehicles. In one embodiment, the rules engine 240 compares 515 the aggregate behavior metrics to one or more behavior thresholds that may be specified by the mobility operator 130, such as a maximum amount of incurred parking event fees or a cap on a number of parking events occurring during application of a scaling modifier or a maximum number of parking events occurring at a specified type of geographic area of interest.

In response to the aggregate behavior metrics exceeding one or more of the behavior thresholds, the rules engine 240 generates 520 at least one suggested behavior modification for the fleet vehicles and reports 525 the suggested behavior modification(s) to the mobility operator 130. For example, if the behavior threshold is a cap on a total amount of time that fleet vehicles have spent parking in a particular area over a time period, the rules engine 240 might generate a behavior modification directing fleet vehicles to different portions of the geographic region for parking events occurring after the cap for the time period has been exceeded. In another example, if the behavior threshold is a maximum amount of parking and toll fees incurred by fleet vehicles on a monthly basis, the rules engine 240 might generate a behavior modification directing fleet vehicles to lower-cost or free parking areas or directing vehicles to avoid areas of high demand for parking (e.g., areas in which a scaling multiplier is applied to parking fees) if that cap has been exceeded.

Figure 6:
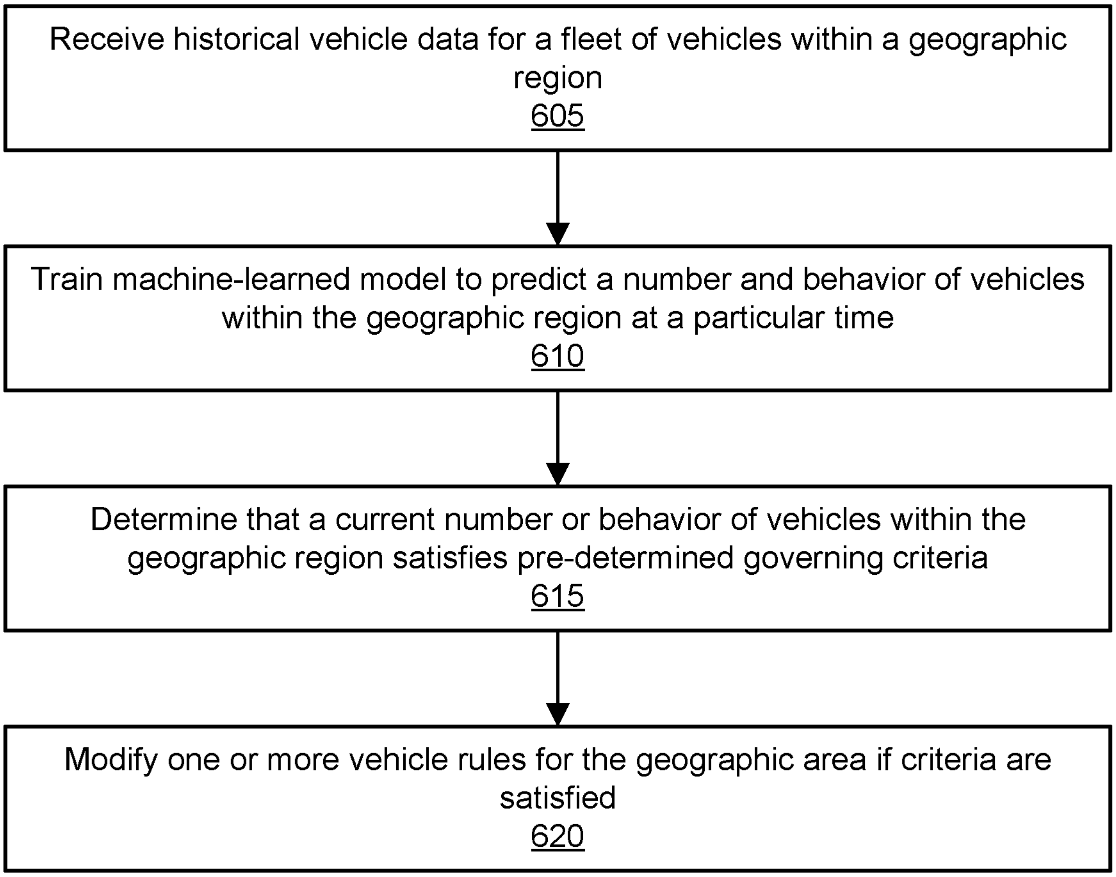
FIG. 6 is a flow chart illustrating a method for modifying vehicle rules based on historical behavior data, according to one embodiment.

FIG. 6 is a flow chart illustrating a method 600 for modifying vehicle rules based on historical behavior data, according to one embodiment. The method 600 begins with the mobility operator interface module 220 receiving 605 historical vehicle data for a fleet of vehicles within a specified geographic region. In one embodiment, the historical vehicle data includes GPS location information for each fleet vehicle while the vehicle was within the geographic region. For example, where the geographic region is a city, the historical vehicle data might include data regarding fleet vehicle parking events occurring within city boundaries, the durations of those parking events, and the types of geographic areas of interest (e.g., parking meters, parking garages, parking lots, etc.) associated with the GPS locations. The historical vehicle data may be received from one or more mobility operators 130 and stored in the geographic data store 270.

The model training module 260 uses the historical vehicle data to train 610 a machine-learned model to predict a number and behavior of vehicles within the geographic region at a particular time. In various embodiments, the prediction is performed for the current time period or for an upcoming time period, and the vehicle behavior prediction includes an indication of how many vehicles (including but not limited to fleet vehicles associated with one or more mobility operators 130) are likely to be located within the geographic region during the specified time period, where the vehicles are likely to be located, whether the vehicles are likely to engage in parking events or otherwise trigger application of vehicle rules, the duration of predicted parking events, and the like.

The rules engine 240 uses the model output to determine 615 that a current number of behavior of vehicles within the geographic region satisfies pre-determined governing entity criteria. For example, the governing entity criteria may specify a threshold number of vehicles within the geographic region and include criteria related to the behavior of those vehicles such as a threshold number of parking events, a threshold number of parking events over a specified duration, a threshold number of parking events at various types of geographic areas of interest, and the like. The governing entity criteria may be defined by one or more public or private entities that operate geographic areas of interest within the geographic region. For example, a first set of governing entity criteria may be provided by a public entity, such as a city, that operates parking meters and parking garages within city boundaries while a private entity that operates a private parking lot may specify a second set of governing entity criteria.

The rules engine 240 modifies 620 one or more vehicle rules for the geographic region in response to determining that one or more governing entity criteria specified by one or more public or private entities are satisfied. The modifications may relate to fees associated with parking events, such as the application of a scaling modifier to base parking fees for geographic areas of interest governed by the entity for whom the governing entity criteria were satisfied. The scaling modifiers may be applied to all or to a subset of geographic areas of interest in the geographic region, and different modifiers may be applied to different geographic areas of interest or types of geographic areas of interest. For instance, a first fee multiplier may be applied for parking events occurring at an on-street parking meter, while a second fee multiplier may be applied to parking events occurring in a parking garage. Moreover, different modifiers may be applied based on the predicted level of parking demand (e.g., the amount by which a threshold in the governing entity criteria was exceeded). For example, a first scaling modifier may be applied if the demand level exceeds a first threshold, while a second scaling modifier may be applied if the rules engine 240 determines that a second demand threshold is exceeded.

Computing Hardware

Figure 7:
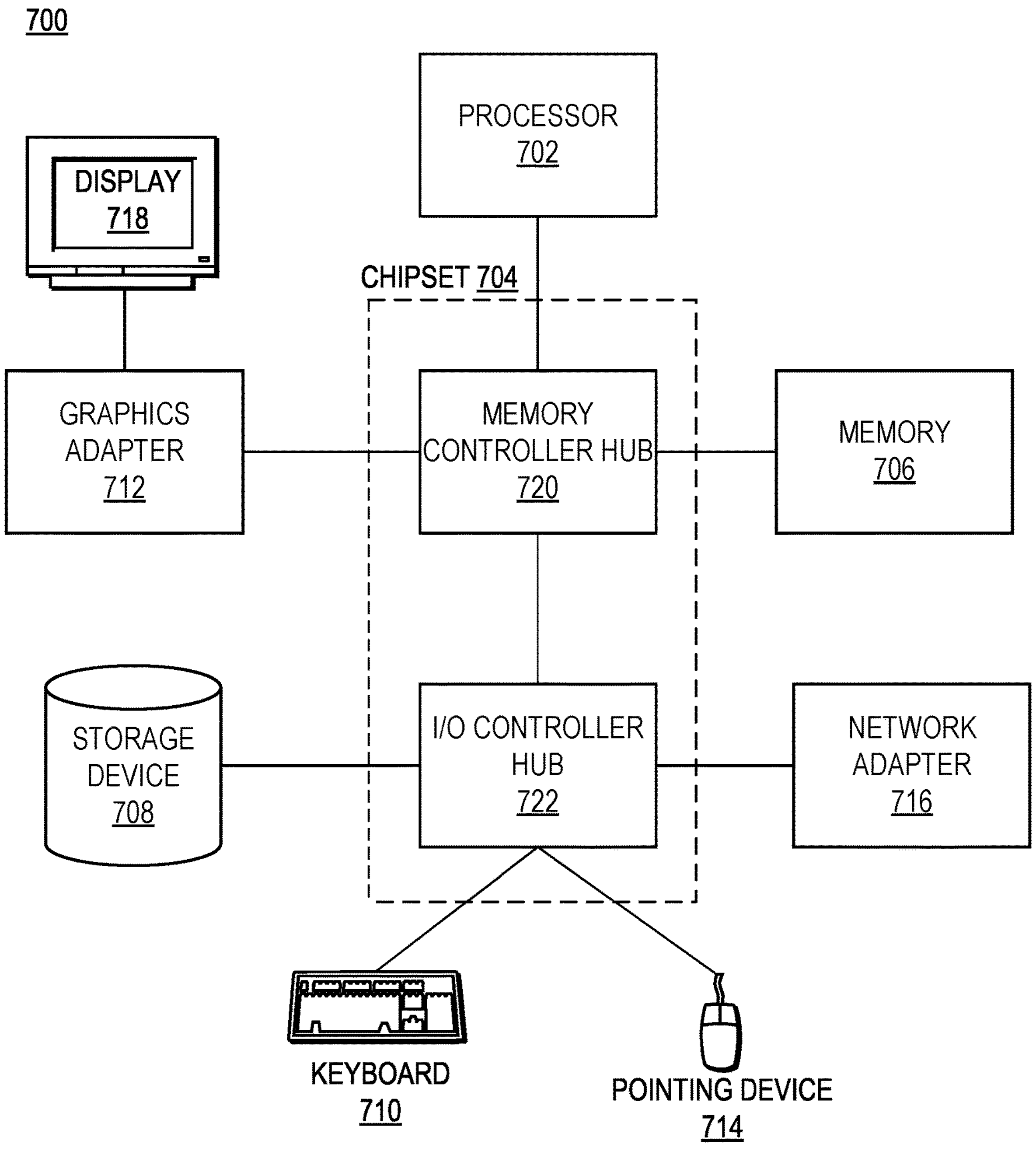
FIG. 7 is a block diagram illustrating components of a computer used as part or all of the mobility management system, governing entity server, mobility operator, or client device, according to one embodiment.

The entities shown in FIG. 1 are implemented using one or more computers. FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, fewer, or variations of the components provided in FIG. 7. Although FIG. 7 depicts a computer 700, the figure is intended as functional description of the various features that may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random-access memory, such as DRAM, SRAM, DDR RAM, ROM, EEPROM, flash memory.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for performing the methods described herein. Thus, while particular embodiments and applications have been illustrated and described, it is to be understood that the described subject matter is not limited to the precise construction and components disclosed herein and that various modifications, changes and variations, which will be apparent to those skilled in the art, may be made in the arrangement, operation and details of the methods and systems disclosed. The scope of protection should be limited only by the following claims.

The invention claimed is:

1. A computer-implemented method for performing vehicle fleet tracking, the method comprising:

receiving, at a mobility management system from a mobility operator, historical vehicle data for a fleet of vehicles within a specified geographic region for a specific time period, the historical vehicle data including, for each vehicle in the fleet of vehicles, corresponding GPS location information for the vehicle while the vehicle was within the specified geographic region;

determining, by the mobility management system, one or more aggregate behavior metrics for the fleet of vehicles during the specific time period using the historical vehicle data; and in response to the aggregate behavior metrics exceeding one or more behavior thresholds, generating, by the mobility management system, one or more behavior modifications for fleet vehicles currently within the geographic region, wherein the one or more behavior modifications relate to parking events occurring at geographic areas of interest within the geographic region.

2. The computer-implemented method of claim 1, further comprising modifying one or more fleet vehicle behaviors based on the one or more behavior modifications.

3. The computer-implemented method of claim 1, wherein the one or more behavior modifications direct fleet vehicles to park in different types of geographic areas of interest within the geographic region for a remainder of the specific time period.

4. The computer-implemented method of claim 1, wherein the historical vehicle data further includes one or more of durations of parking events occurring in the geographic region, fees associated with the parking events, and instances of fleet vehicles incurring road usage fees.

5. The computer-implemented method of claim 1, wherein the one or more behavior thresholds include a maximum total cost associated with parking events occurring in the geographic region.

6. The computer-implemented method of claim 1, wherein the mobility management system notifies the mobility operator if the one or more behavior thresholds for the specific time period have not been exceeded.

7. A non-transitory computer-readable storage medium comprising instructions executable by a processor, the instructions executable to perform operations comprising:

receiving, at a mobility management system from a mobility operator, historical vehicle data for a fleet of vehicles within a specified geographic region for a specific time period, the historical vehicle data including, for each vehicle in the fleet of vehicles, corresponding GPS location information for the vehicle while the vehicle was within the specified geographic region;

determining, by the mobility management system, one or more aggregate behavior metrics for the fleet of vehicles during the specified time period using the historical vehicle data; and in response to the aggregate behavior metrics exceeding one or more behavior thresholds, generating, by the mobility management system, one or more behavior modifications for fleet vehicles currently within the geographic region, wherein the one or more behavior modifications relate to parking events occurring at geographic areas of interest within the geographic region.

8. The non-transitory computer-readable storage medium of claim 7, wherein the operations further comprise modifying one or more fleet vehicle behaviors based on the one or more behavior modifications.

9. The non-transitory computer-readable storage medium of claim 7, wherein the one or more behavior modifications direct fleet vehicles to park in different types of geographic areas of interest within the geographic region for a remainder of the specific time period.

10. The non-transitory computer-readable storage medium of claim 7, wherein the historical vehicle data further includes one or more of durations of parking events occurring in the geographic region, fees associated with the parking events, and instances of fleet vehicles incurring road usage fees.

11. The non-transitory computer-readable storage medium of claim 7, wherein the one or more behavior thresholds include a maximum total cost associated with parking events occurring in the geographic region.

12. The non-transitory computer-readable storage medium of claim 7, wherein the mobility management system notifies the mobility operator if the one or more behavior thresholds for the specific time period have not been exceeded.

* * * * *